United States Patent Office 2,836,402
Patented May 27, 1958

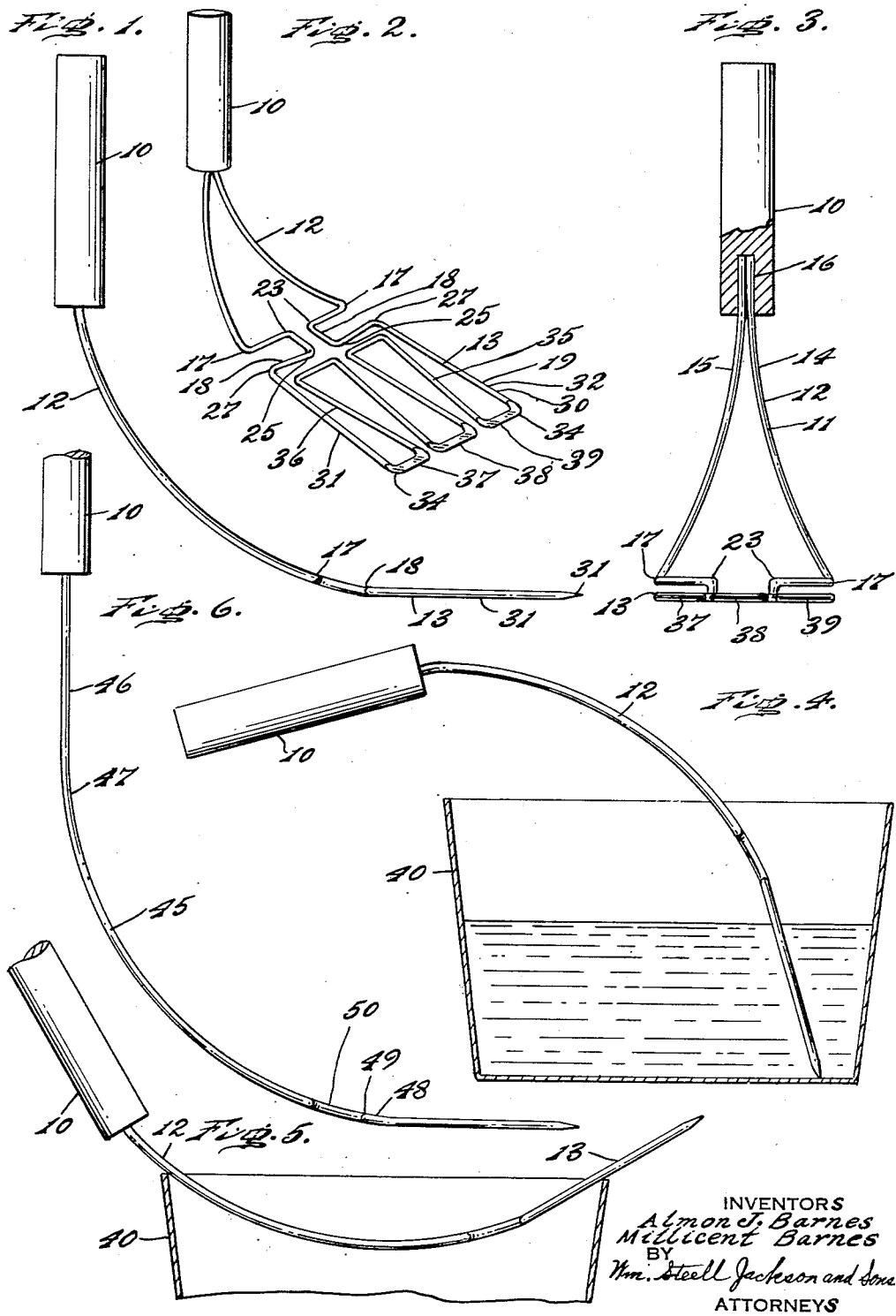

2,836,402

STIRRER

Almon J. Barnes and Millicent Barnes, Wilkes-Barre, Pa.

Application October 11, 1954, Serial No. 461,552

4 Claims. (Cl. 259—144)

This invention relates to a device which is intended especially for stirring food being cooked, as in the case of puddings, cereal, sauces and the like, and which has certain other uses which will be gone into.

A purpose of the invention is to provide a device for stirring food while it is being cooked, which will eliminate or greatly reduce any chance of the hands being burned by being splattered with the material undergoing cooking.

A further purpose of the invention is to provide a device for stirring food undergoing cooking, which device is especially effective in said stirring.

A further purpose is to provide a device for stirring material being cooked, which device can readily be set down on top of the pot when not in use.

A further purpose is to provide a device for stirring materials being cooked, which device will have certain other special uses.

Further purposes and advantages will be apparent from the following description and the claims.

Figure 1 is a side view of one embodiment of the invention.

Figure 2 is a perspective view of the same.

Figure 3 is a front view of the same, with the handle partly broken away.

Figure 4 is a side view of the same together with a sectional view of a pot containing material being stirred, showing one possible position for such stirring.

Figure 5 is a side view of the same embodiment of the invention, with the handle partly broken away, and a cross section of a pot partly broken away, with the device resting out of use on the pot.

Figure 6 is a side view of another embodiment of the stirrer of the invention, with the handle partly broken away.

Taking first the embodiment of Figures 1 to 5, as will be noted from the drawings the device consists of a handle 10, preferably made of wood or some such material, and a metal portion 11 having a shank 12 and a stirring portion 13. The metal portion 11 is preferably formed out of one continuous, more or less rigid, wire, aluminum or stainless steel being especially suitable, the wire when made of aluminum being preferably on the order of ⅛ of an inch or a little more in diameter and when made of stainless steel, being preferably somewhat less. It takes the shape shown in the figures which may be described more or less as follows:

The shank 12 consists of wire end portions 14 and 15, both of which at their ends 16 are tightly embedded side by side in the wooden handle 10 and rigidly held thereby, utilizing any convenient means, such as inserting them into a hole in the end of the handle and then driving wood wedges into the rest of the hole. Once outside of the handle, the shank curves sharply at the outset and thereafter more gradually. At the same time, the two wires of which the shank is composed diverge, so that at points 17, at the end of the shank, which in this particular example, is roughly seven inches long measured along the curve, the wires are well spaced— in this example a little over two inches apart. In this example, the shank at 17 is roughly 5 inches from the end of the handle in a longitudinal direction and roughly 4 inches over from the prolongation of the axis of the handle.

The stirring portion is in the example made up of the intermediate portion of the continuous wire and consists of opposed side loops 18, which continue the slight curvature of the shank, and planar portion 19.

The side loops 18 extend sharply inward toward each other from points 17 to points 23, then parallel to each other in a continuation of the curvature of the shank to points 25, then outwardly to points 27.

The loops thus formed taper outwardly slightly from neck to base, having in this example an approximate inside dimension of five-eighths of an inch across at the narrowest point near the mouth, tapering outwardly to a little over eleven-sixteenths of an inch near the base, with the base roughly one inch from the mouth.

Disregarding gaps and small variations, the overall outline of the perimeter of the stirring portion 13 as a whole is that of an isosceles trapezoid with its top side on the line between corners 17, and correspondingly the said outline in the case of the planar portion is that of an isosceles trapezoid with its top side on the line between corners 27. Both shank and stirring portion are symmetrical relative to their own midline.

The planar portion 19 starts at points 27 and extends in a direction which is approximately at right angles to that of the wooden handle and which, in the example shown, forms a slight angle with the tangent to the last portion of the curved shank. The two sides 31 and 32 of this portion go from points 27 in somewhat diverging direction to corners 34, the sides in this example being each roughly three and three-quarter inches long and reaching a point about three inches apart at the corners 34.

Between these two corners 34 the wire follows a straight path interrupted by long interior loops 35 and 36, so that the planar portion is more or less serpentine in pattern, with edges 37, 38 and 39 along the end of the device forming parts of one continuous straight line perpendicular to the center line of the metal portion 11. Loops 35 and 36 each taper gradually from a relatively narrow mouth at the end of the device to a relatively broad base back nearly at the other end of the planar part, the configuration along the line of the edges 37, 38 and 39 being such that despite all the corners at the ends of these edges (including corners 34) being rounded, these straight edges are longer than the gaps between them and much the greater part of a straight line passing between corners 34 is along these straight edges rather than in the gaps. These straight portions along the end of the device, unlike the rest of the wire which is round, are thinned down in a taper so that the edge along the end comes to almost a sharp edge.

In using the device for stirring material being cooked, such as puddings, cereals, sauces and possibly soups, the device is employed with the concavity of its overall curvature more or less down, and the straight edges of the end on the bottom of the pot, more or less as shown in Figure 4, except that when greater protection from splattering is desired for the hands, the handle can be held further down except when it is desired to stir the near end of the pot.

It will be seen that the possibility of material from the pot splattering the hands is greatly minimized and may be practically eliminated in the use of this stirring device as compared to the ordinary spoon or other stirring device, and thus the danger of burnt hands is much less.

Furthermore, this device will do a very efficient stirring job, where there is material in lumps, the material being forced through the variant-dimensioned interstices in the stirring portion of the device, and the lumps thus being eliminated. Furthermore, as indicated in the drawing, during the stirring the end of the device will be on the bottom of the pot and will do an especially thorough and efficient job of stirring material near the bottom, thus preventing the formation of burnt or overcooked spots on the bottom with a minimum of effort on the part of the person stirring.

When all the stirring that is necessary for the time being has been completed, the device can be very readily put on the pot 40 in the position shown in Figure 5 with the convex side of the curvature more or less downward, and will rest there in perfect safety, with no tendency to slide off or into the pot, in close proximity to the thing to be stirred, so as to be very readily able to be taken up again when stirring is desired to be resumed.

The device is also very useful in a number of other special ways. More specifically, the two loops 18 coming in from the side toward each other at the handle end of the stirring portion, can readily be used to pick up frankfurters by placing the device with one side down over the frankfurter at the mouth of the loop, so that the frankfurter comes up through the narrowest part of the loop, which is more or less a neck, and is thereafter held in the loop until removed as by putting the frankfurter inside of a split roll and grasping the roll. The inside dimensions across the loops 18 are slightly less than the normal width of a frankfurter in cooked condition, so that the frankfurter will be firmly held. The stirring portion can also be put under various objects in hot water to lift them out, such as for example meat, eggs, etc., and can be used to turn things like hamburgers and pancakes over.

The form of Figure 6 is substantially the same as that of Figures 1 to 5, except as follows:

The shank 45 of the metal portion of Figure 6 is decidedly longer than the shank 12 of the metal portion of Figures 1 to 5, the extra length being about 6 inches toward the wooden handle end, in which the wires are side by side and start out straight in the part 46 and then assume gradual curvature in the part 47. Also the curvature of the metal portion continues at 48 on a little beyond the ends 49 of the side loops 50 which correspond to side loops 18 in the other form. This form of Figure 6 is, if anything, somewhat preferable to the shorter form illustrated in Figures 1 to 5, but for reasons of simplicity of illustration, the other has been emphasized in the drawings.

The various uses and advantages involved in the other embodiment are all involved in that of Figure 6, with the addition of even greater protection from splattering in its use.

Having thus described our invention what we claim as new and desire to secure by Letters Patent is:

1. A multi-purpose kitchen utensil intended especially for stirring food while the food is being cooked, comprising a handle having a longitudinal axis, a metal portion having an approximately arcuate portion forming a shank and then at the end beyond the arcuate portion from the handle a substantially planar portion which is substantially perpendicular to the axis of the handle, said metal portion having at the end away from the handle and including at least most of the said planar portion a convoluted figure which has an approximate overall perimetral outline, excluding gaps, of an isosceles trapezoid with its base at the end away from the handle and an altitude greater than its base, which convoluted figure includes a plurality of interior end loops having narrow mouths open at the end away from the handle and sides gradually widening back from the mouths, there being between and on either side of the mouths edges straight along the base of said trapezoid which collectively include the greater part of said base, and which convoluted figure includes also at least one interior side loop adapted to pick up frankfurters.

2. A combination utensil intended especially for stirring food that is being cooked comprising a handle having an axis, and a shank and a stirring portion which are both formed from the one wire, the shank comprising the two ends of said wire each attached to the same end of said handle and extending from said handle somewhat divergently as compared to the other, but together curving away from said axis of the handle in an arc which at the end of the shank away from the handle is substantially at right angles from said axis, and said stirring portion being the midportion of the wire, stretching from the end of the shank away from the said axis in substantially a plane substantially at right angles to said axis and forming in overall outline an isosceles trapezoid having its base at the far end and its altitude greater than its base, but with deep recesses in the said far end formed by open loops extending back toward the said axis in gradually increasing breadth, and with at least one recess opening out on a side close to the shank and formed by a loop having a mouth slightly smaller than an ordinary frankfurter in cooked condition.

3. A multi-purpose kitchen utensil intended especially for stirring food while the food is being cooked, comprising a handle having a longitudinal axis, a metal portion having an approximately arcuate portion forming a shank and then at the end beyond the arcuate portion from the handle a substantially planar portion which is substantially perpendicular to the axis of the handle, said metal portion having at the end away from the handle and including at least most of the said planar portion a convoluted figure which has an approximate overall perimetral outline, excluding gaps, of an isosceles trapezoid with its base at the end away from the handle and an altitude greater than its base, which convoluted figure includes a plurality of interior end loops having narrow mouths open at the end away from the handle and sides gradually widening back from the mouths, there being between and on either side of the mouths edges straight along the base of said trapezoid which collectively include the greater part of said base.

4. A utensil intended especially for stirring food that is being cooked comprising a handle having an axis, and a shank and a stirring portion which are both formed from the one wire, the shank comprising the two ends of said wire each attached to the same end of said handle and extending from said handle somewhat divergently as compared to the other, but together curving away from said axis of the handle in an arc which at the end of the shank away from the handle is substantially at right angles from said axis, and said stirring portion being the midportion of the wire, stretching from the end of the shank away from the said axis in substantially a plane substantially at right angles to said axis and forming in overall outline an isosceles trapezoid having its base at the far end and its altitude greater than its base, but with deep recesses in the said far end formed by open loops extending back toward the said axis in gradually increasing breadth.

References Cited in the file of this patent

UNITED STATES PATENTS

| | | |
|---|---|---|
| 345,709 | Marsh | July 20, 1886 |
| 1,617,787 | Andrews | Feb. 15, 1927 |
| 1,751,853 | Buck | Mar. 25, 1930 |
| 2,023,451 | Vaughn | Dec. 10, 1935 |
| 2,663,555 | Milliken | Dec. 22, 1953 |